(12) United States Patent
Ito (10) Patent No.: US 6,199,888 B1
(45) Date of Patent: Mar. 13, 2001

(54) MAIN STAND STRUCTURE FOR MOTORCYCLES

(75) Inventor: Hiroyuki Ito, Saitama (JP)

(73) Assignee: Honda Giken Kogyo Kabishiki Kaisha, Tokyo (JP)

(*) Notice: Subject to any disclaimer, the term of this patent is extended or adjusted under 35 U.S.C. 154(b) by 0 days.

(21) Appl. No.: 09/392,575

(22) Filed: Sep. 9, 1999

(30) Foreign Application Priority Data

Sep. 11, 1998 (JP) .................................................. 10-257934

(51) Int. Cl.[7] .................................................. B62K 11/02
(52) U.S. Cl. .................................................. 280/303
(58) Field of Search .................................. 280/293, 295, 280/301, 302, 303, 763.1; 180/219

(56) References Cited

U.S. PATENT DOCUMENTS 518,022 * 4/1894 Crunkleton .
4,775,164 * 10/1988 Jan ....................................... 280/303

FOREIGN PATENT DOCUMENTS 274487 3/1990 (JP) .
5-65091 * 3/1993 (JP) .

* cited by examiner

*Primary Examiner*—Kevin Hurley
(74) *Attorney, Agent, or Firm*—Birch, Stewart, Kolasch & Birch, LLP (57) ABSTRACT

A main stand structure including a pivot tube mounted on an engine by a pivot shaft and left and right legs. The left leg extends from a first point that is spaced a predetermined distance to the left from a vehicle body center on the pivot tube, and the right leg has an upper end joined to a portion of the left leg. A reinforcement member extends from a portion of the right leg substantially parallel to the left leg, and has an end joined to the pivot tube at a second point which is in substantially symmetrical relationship to the first point with respect to the vehicle body center. The reinforcement member and the right leg jointly make up a V-shaped portion which allows exhaust pipes to extend.

14 Claims, 6 Drawing Sheets

MAIN STAND STRUCTURE FOR MOTORCYCLES

BACKGROUND OF THE INVENTION

1. Field of the Invention

The present invention relates to an improvement in a main stand structure for a motorcycle.

2. Background Art

Many motorcycles have a main stand which is erected for use when the motorcycle is parked or stopped. For example, such a main stand structure is disclosed in Japanese laid-open patent publication No. Hei 2-74487 entitled "Riding-type vehicle".

According to the above conventional art, as shown in FIGS. 2 and 6 of the publication, a pair of left and right stand brackets 43 is mounted on a rear lower portion of a frame 2 (reference numerals are cited from the publication), and a main stand 44, which is substantially portal-shaped as viewed from behind, is attached to the stand brackets 43. The main stand 44 comprises a pivot shaft 45 vertically swingably supported by the stand brackets 43, a left leg, (no reference numeral) and a right leg 44a extending downwardly from the pivot shaft 45, and a cross member extending between the left and right legs.

The motorcycle has an engine exhaust system having four exhaust pipes 36 extending from an engine 27 on a front portion of the vehicle body and joined to a common pipe 37 which is connected to an exhaust muffler 38 on a rear portion of the vehicle body.

The common pipe 37 extends upwardly and outwardly of the right leg 44a of the main stand 44 as it is erected. A passage for the common pipe 37 should be provided as closely to the center of the vehicle body as possible. To meet this requirement, as shown in FIG. 6, the right leg 44a has an upper end positioned closely to the center of the vehicle body, extends downwardly from the upper end, is curved downwardly to the right from a certain portion thereof and then further curved downwardly from a certain portion thereof. Therefore, the right leg 44a comprises a bent member with two bends.

According to the above conventional art, with the upper end of the right leg 44a being positioned closely to the center of the vehicle body, there is a certain limitation on efforts to maintain a passage for the common pipe 37 close to the center of the vehicle body. Since the upper end of the right leg 44a is positioned close to the center of the vehicle body, when the weight of the vehicle body is borne by the main stand 44, the left leg and the right leg 44a are subject to an unbalanced load. Therefore, it is necessary to take measures to stably bear the weight of the vehicle body, and also to increase the rigidity of the right leg 44a. As a result, the weight of the main stand 44 increases.

Furthermore, because the right leg 44a has a complex shape with two bends, it is tedious and time-consuming to bend the right leg. Furthermore, since the right leg 44a has many bends, the weight thereof increases in order to maintain a required level of rigidity. It is therefore an object of the present invention to provide a technology which is capable of easily providing a passage for engine exhaust pipes (including a common pipe) at the position of a main stand in the vicinity of the center of a vehicle body, and also of reducing the weight of the main stand.

SUMMARY OF THE INVENTION

To achieve the above object, there is provided a main stand structure for a motorcycle, having a pivot tube mounted on a vehicle body frame or an engine by a pivot shaft and left and right legs, characterized in that one of the left and right legs extends from a first point spaced a predetermined distance from a vehicle body center on the pivot tube, and the other of the left and right legs has an upper end joined to a portion of the one leg, a reinforcement member extends obliquely outwardly and upwardly from a portion of the other leg and has an end joined to the pivot tube at a second point which is in substantially symmetrical relationship to the first point with respect to the vehicle body center, so that the reinforcement member and the other leg jointly make up a V-shaped portion which allows an exhaust pipe to extend.

Since the reinforcement member and the other leg jointly make a V-shaped portion which allows the exhaust pipes to extend, a passage for an engine exhaust pipe can easily be provided at the erected position of a main stand in the vicinity of the center of a vehicle body.

The weight of a vehicle body can be borne in a well-balanced manner by the first and second points that are substantially symmetrical in the horizontal direction. Therefore, the main stand, whose weight is well balanced, can stably bear the weight of the vehicle body.

In as much as the left leg and the right leg support each other, the main stand has a high level of rigidity. Because of the high level of rigidity, the diameter and thickness of the members of the main stand can be reduced for a reduction in the weight thereof.

Furthermore, each of the left and right legs comprises a bent member which has a single bend. Since the left and right legs have few bends, they can easily be bent. The left and right legs have a higher level of rigidity than if they had more bends, so that the diameter and thickness of the members of the main stand can be reduced for a reduction in the weight thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the present invention will be described below with reference to the accompanying drawings. The terms "front", "rear", "left", "right", "upper", "lower" and similar directional terms used herein refer to directions as viewed from the rider of a motorcycle, and Fr, Rr, L, R represent front, rear, left, and right sides, respectively. The figures shall be viewed in accord with the orientation of the reference characters.

Figure 1:
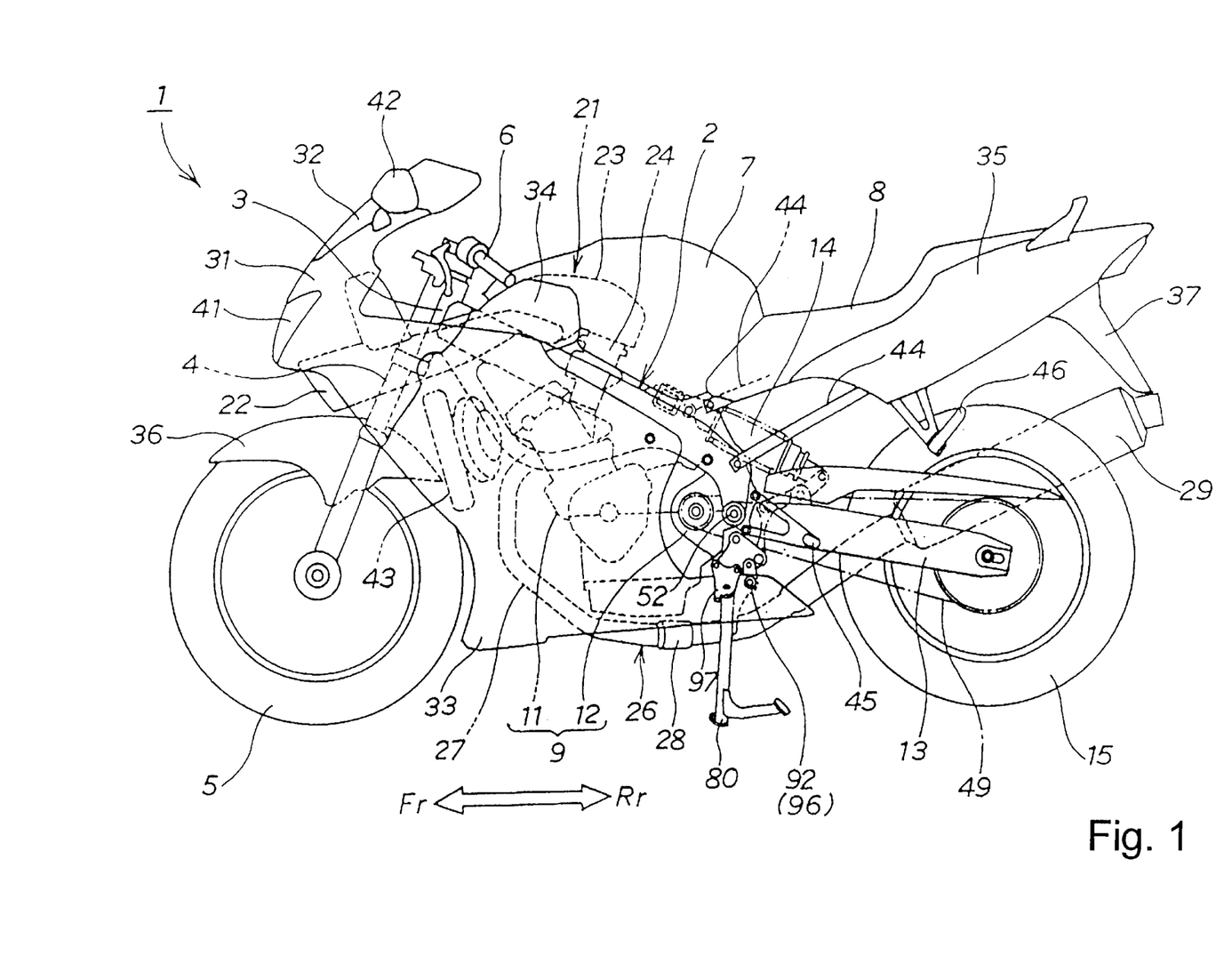
FIG. 1 is a side elevational view of a motorcycle according to the present invention.

As illustrated in FIG. 1, the motorcycle 1 comprises a vehicle body frame (a vehicle body) 2, a front fork 4 mounted on a head pipe 3 of the vehicle body frame 2, a front wheel 5 mounted on the front fork 4, a handle 6 coupled to the front fork 4, a feel tank 7 mounted astride of an upper front portion of the vehicle body frame 2, a seat 8 mounted on an upper rear portion of the vehicle body frame 2, a power unit 9 (a combination of an engine 11 in a front region and a transmission 12 in a rear region) mounted on a lower front portion of the vehicle body frame 2, a swing arm (rear fork) 13 mounted on a lower rear portion of the vehicle body frame 2, a rear suspension 14 by which an intermediate portion of the swing arm 13 is suspended from the vehicle body frame 2, and a rear wheel 15 mounted on a rear end of the swing arm 13.

The engine 11 has an intake system 21 comprising an inlet duct 22, an air cleaner 23, and a carburetor 24.

The engine 11 has an exhaust system 26 comprising four exhaust pipes 27 (only one shown) connected to exhaust ports of the engine 11, a common pipe 28 for collecting exhaust gases from the exhaust pipes 27, and a muffler 29.

The motorcycle 1 includes a fully-cowled two-wheeled vehicle which has an upper cowl 31 covering a front upper portion of the vehicle body frame 2, a wind screen 32 mounted on an upper portion of the upper cowl 31, a side cowl 33 covering sides of the vehicle body frame 2, a duct cover 34 covering a rear side portion of the inlet duct 22, a seat cowl 35 covering a lower portion of the seat 8 on the rear portion of the vehicle body frame 2, a front fender 36 covering an upper portion of the front wheel 5, and a rear fender 37 covering a rear upper portion of the rear wheel 15.

Further shown in FIG. 1, is a head lamp 41, a mirror 42, a radiator 43, seat rails 44, rider's steps 45, passenger's steps 46, and a drive chain 49.

Figure 2:
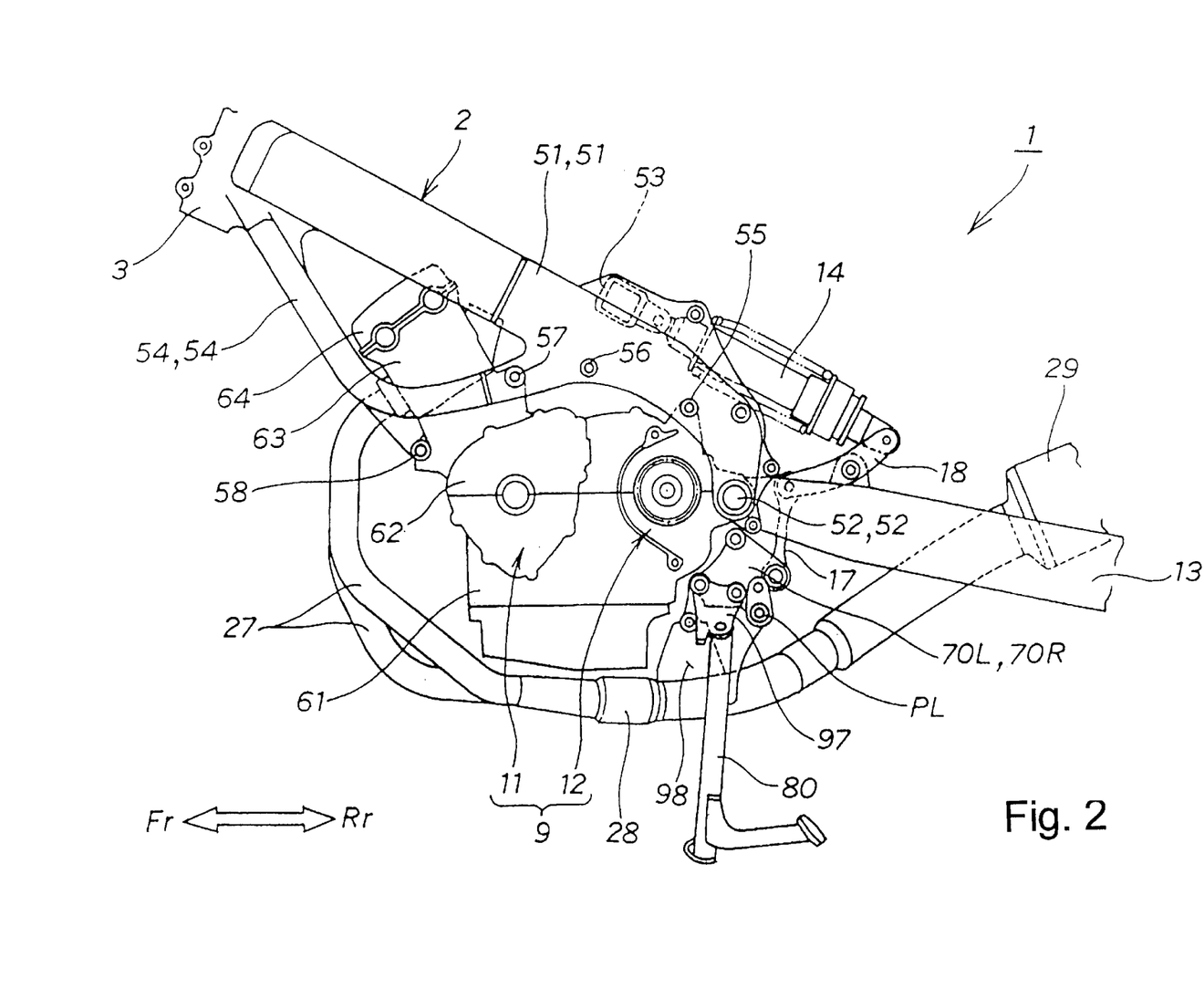
FIG. 2 is a fragmentary side elevational view of the motorcycle according to the present invention.

Illustrated in FIG. 2, the vehicle body frame 2 comprises a pair of left and right main frames 51 (only the left main frame is shown in FIG. 2) extending rearwardly and downwardly from the head pipe 3 and having rear ends extending downwardly, a pair of left and right pivot supports 52 mounted on lower ends of the left and right main frames 51, a cross member 53 extending between longitudinal central portions of the main frames 51, and a pair of left and right auxiliary frames 54, each substantially V-shaped as viewed from a side elevation, extending between a lower portion of the head pipe 3 and lower sides of the longitudinal central portions of the main frames 51.

The power unit 9 is fastened by pivot supports 52 and by four hangers 55–58 to the vehicle body frame 2.

The engine 11 comprises a water-cooled four-cylinder engine which is greatly inclined forwardly and upwardly. The engine 11 comprises a lower crankcase 61 and an upper cylinder block 62 which double as a transmission case. A main stand 80 is mounted on a rear portion of the crankcase 61 by left and right stand attachment brackets 70 L, 70 R. Details of the left and right stand attachment brackets 70L, 70R and the main stand 80 will be described later on. Also shown is a cylinder head 63, and a head cover 64.

A suspension structure for the swing arm 13 will be described in specific detail below.

The suspension structure for the swing arm 13 comprises a so-called progressive suspension structure. Specifically, a front end of the swing arm 13 is vertically swingably mounted on the left and right pivot supports 52, and a first link 17 has an end coupled to the left and right stand attachment brackets 70L, 70R. The other end of the first link 17, a front upper portion of the swing arm 13, and a rear end of the rear suspension 14 are coupled to each other by a second link 18. The rear suspension 14 has a front end vertically swingably mounted on the cross member 53.

Figure 3:
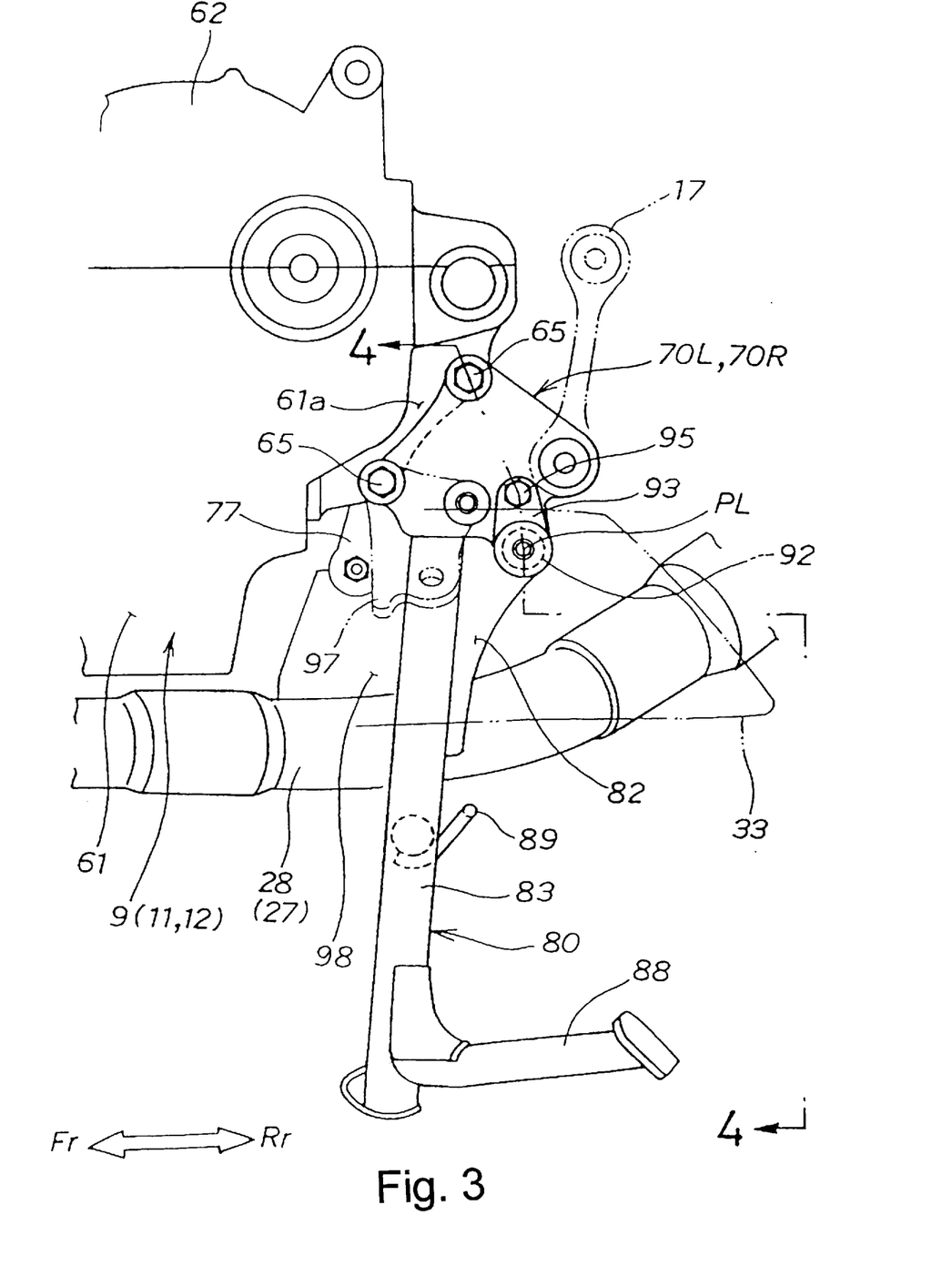
FIG. 3 is a side elevational view of a main stand attachment structure according to the present invention.
Figure 4:
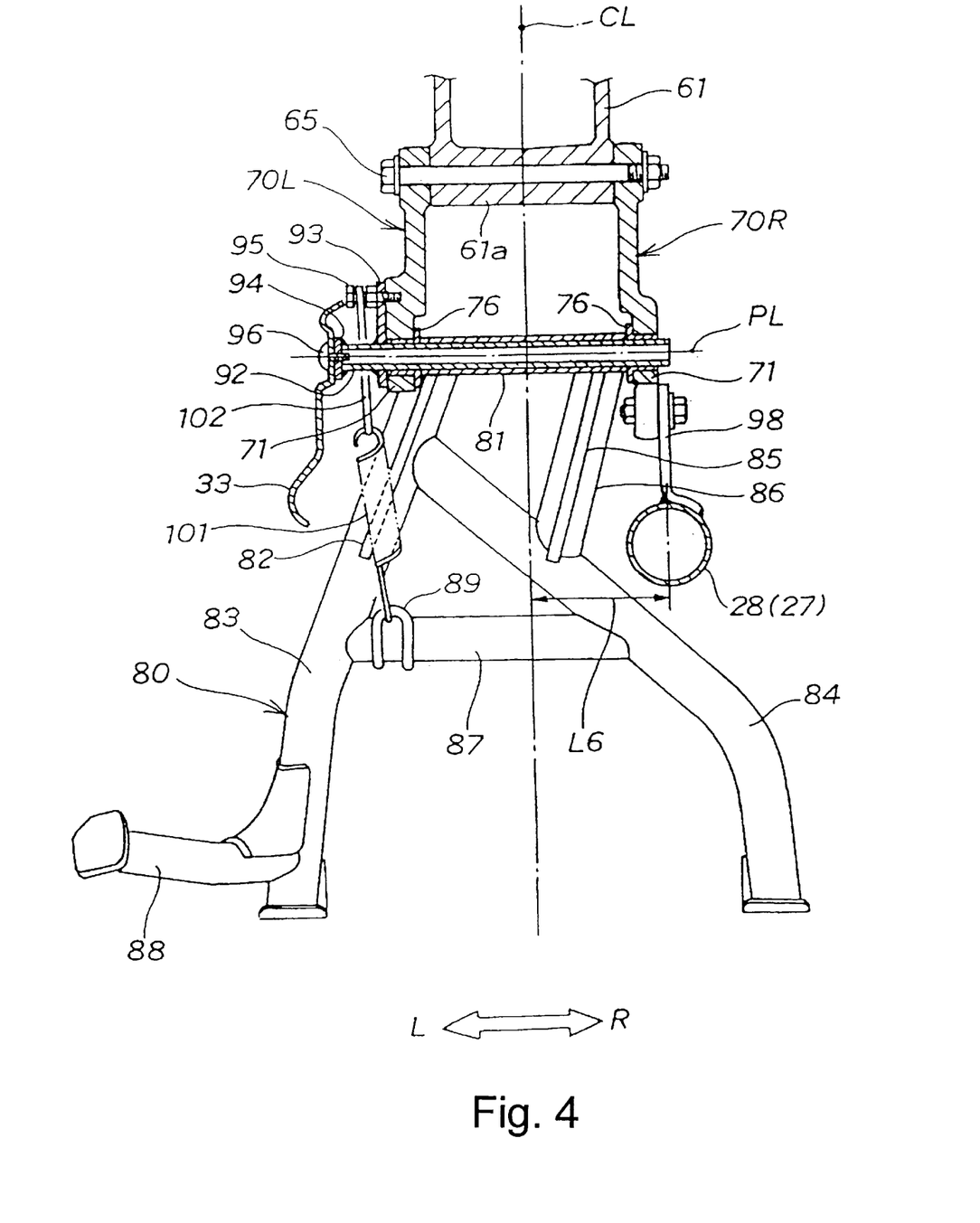
FIG. 4 is a cross-sectional view taken along line 4—4 of FIG. 3.

Illustrated in FIGS. 3 and 4, the engine 11 has a bracket 61 a integrally formed with a rear portion of the crankcase 61, and the left and right stand attachment brackets 70L, 70R (only the left stand attachment bracket is shown in FIG. 3) are mounted on the bracket 61 a by two sets of bolts and nuts 65. The main stand 80 is attached to lower portions of the left and right stand attachment brackets 70L, 70R for vertical swinging movement between an illustrated erected position and a lifted position (not shown).

A side stand bracket 97 indicated by imaginary lines is fixed by a bolt to the left stand attachment bracket 70L. A side stand (not shown) is vertically swingably mounted on the side stand bracket 97. The right stand attachment bracket 70R has a bracket 77 to which an exhaust pipe hanger 98 is fixed by a bolt.

Heretofore, left and right stand attachment brackets have been of an integral structural body. The integral structural body serves to bear the load from a swing arm via the first and second links while the motorcycle is running, and also to bear the weight of the vehicle body and transmit it to a main stand while the motorcycle is parked and stopped. Therefore, the integral structural body needs to be highly rigid as its rigidity as a single component is required, and, as a result, its weight increases. Since the integral structural body is of integral nature, it needs to have attachment seats for mounting related members on its inner surfaces, and hence has poor machinability.

The present invention, on the other hand, resides in that the left and right stand attachment brackets 70L, 70R that are separate horizontally from each other are mounted on the crankcase 61 which is a highly rigid structural body. The composite assembly of the crankcase 61 and the left and right stand attachment brackets 70L, 70R serves the same function as the conventional integral structural body.

The left and right stand attachment brackets 70L, 70R may be rigid enough when combined with the crankcase 61, and hence may be less rigid than the conventional integral structural body. Therefore, the weight of the left and right stand attachment brackets 70L, 70R can be reduced in order to reduce the cost of their material, and inner surfaces thereof to be machined can be reduced, so that the left and right stand attachment brackets 70L, 70R have increased machinability for a reduction in the cost of machining thereof.

The attachment structure for the main stand 80 has a pivot tube 81 of the main stand 80 rotatably mounted by a pivot shaft 92 between attachments 71 of the left and right stand attachment brackets 70L, 70R. The pivot shaft 92 comprises a pipe shaft which extends through the left and right stand attachment brackets 70L, 70R, and has an integral flange 93 fixed by a bolt to the left stand attachment bracket 70L so that the pivot shaft 92 is secured against removal.

The pivot shaft 92 has a left portion extending outwardly with a blind plate 94 welded to a distal end thereof. The side cowl 33 has a rear lower end fastened to the blind plate 94 by a screw 96.

Heretofore, such a side cowl is normally directly fixed to the vehicle body frame by a bolt or, attached to the vehicle body frame or another member by a dedicated bracket. If the side cowl is directly fixed to the vehicle body frame by a bolt, then a new attachment is necessary. If a dedicated bracket is provided, then the number of parts used increases. At any rate, an increase in the cost is inevitable.

According to the present invention, however, the pivot shaft 92 by which the main stand 80 is mounted doubles as an attachment for the side cowl 33. Therefore, neither a new attachment nor a dedicated bracket is necessary for attaching the side cowl 33. Consequently, the number of parts used is reduced, the productivity is increased, and the cost is reduced.

Figure 5:
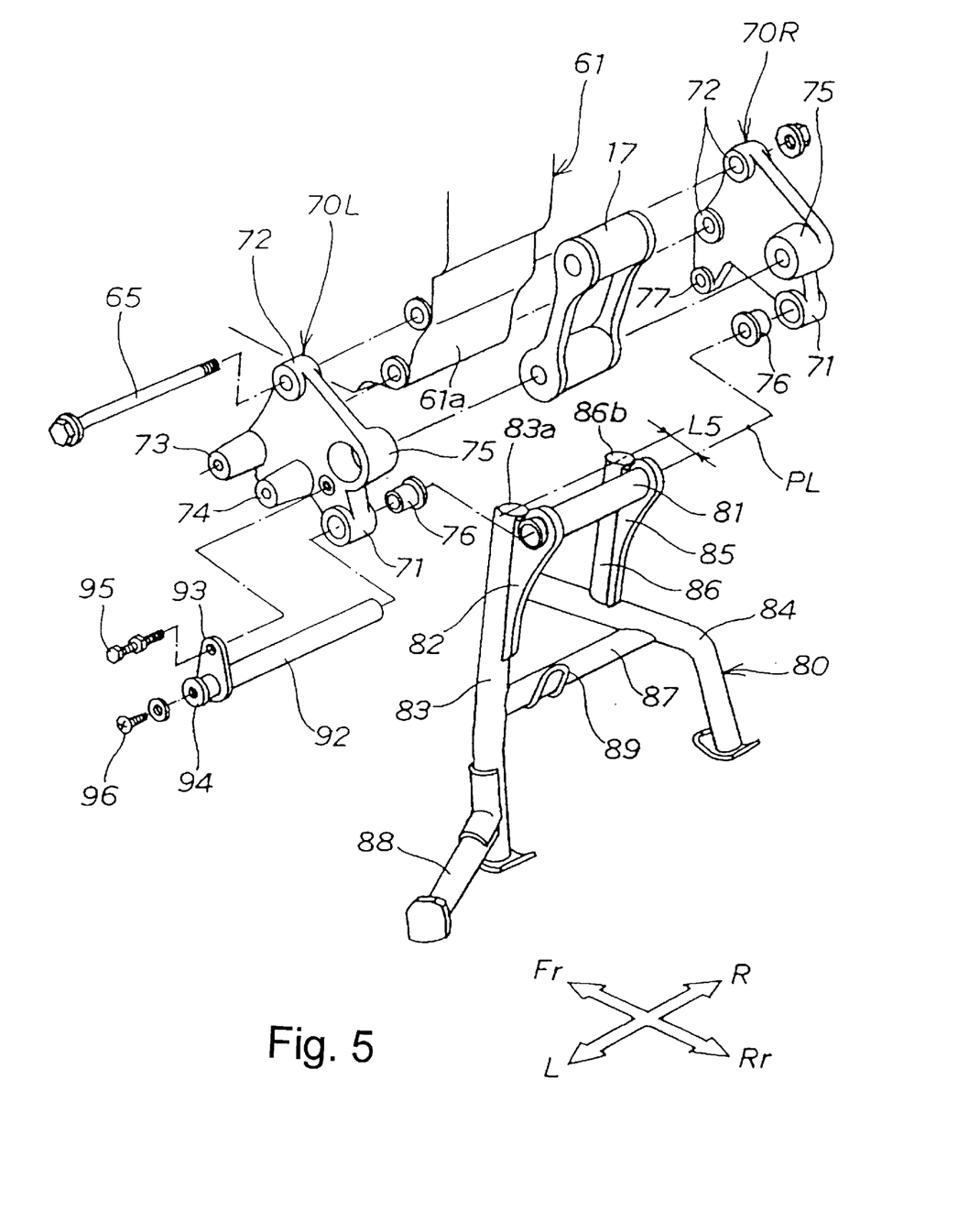
FIG. 5 is an exploded perspective view of the main stand attachment structure according to the present invention.

Shown in FIG. 5 is the relationship between the crankcase 61, the left and right stand attachment brackets 70L, 70R, the first link 17, and the main stand 80. FIG. 5 also shows an overall structure of the main stand 80. Details of the main stand 80 will be described later on. Also denoted in FIG. 5 is bracket attachment bosses 72, a bracket attachment boss 73 doubling as an attachment for the side stand bracket, an attachment boss 74 for the side stand bracket, first link coupling bosses 75, bushings 76, a pivot shaft attachment bolt 95, and a lower cowl attachment screw 96.

Figure 6:
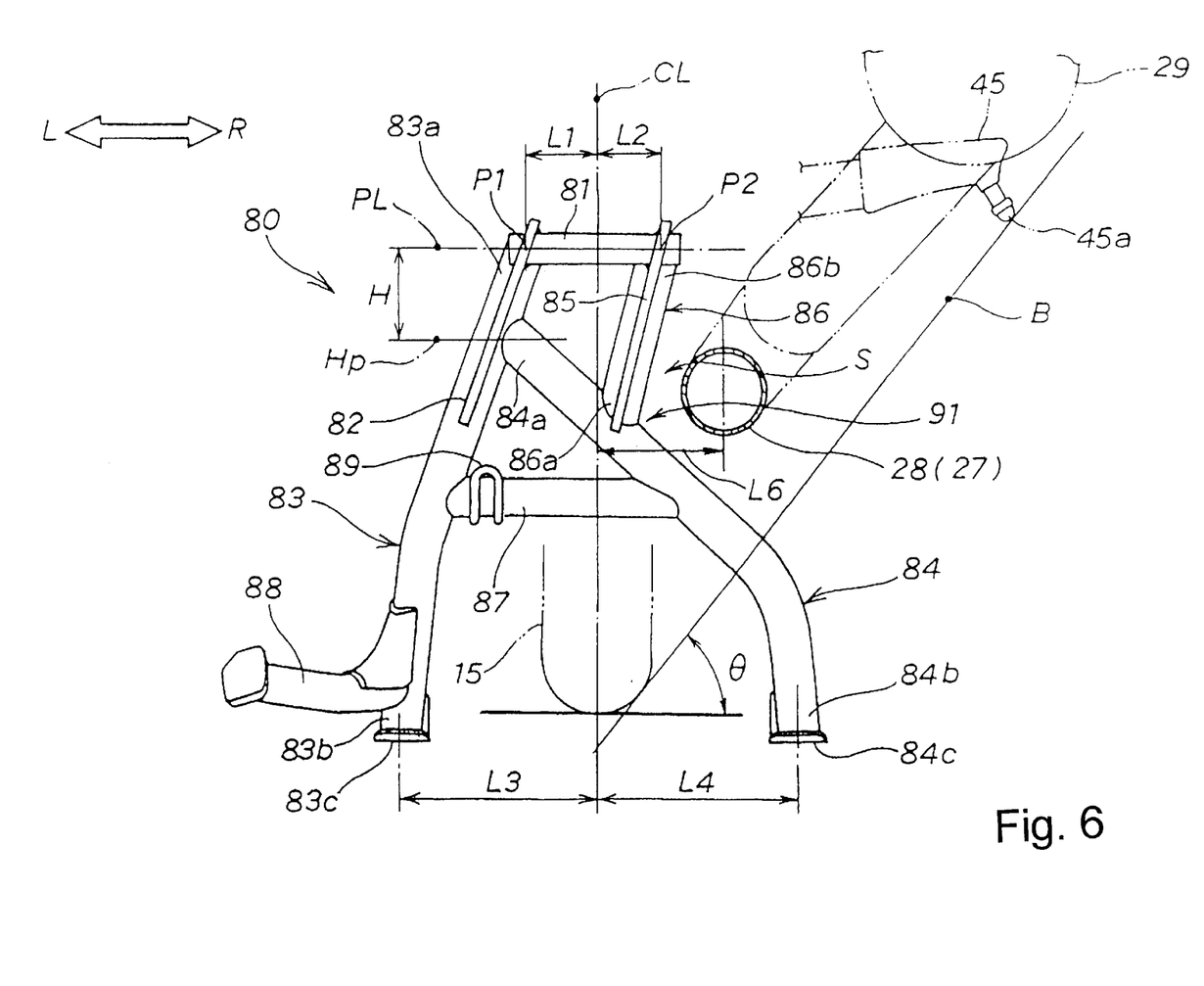
FIG. 6 is a rear elevational view of the main stand according to the present invention.

Shown in the rear elevational view of FIG. 6, the main stand 80 comprises a pivot tube 81 extending along a pivot center PL, a left leg 83 joined to the pivot tube 81 by a left gusset plate 82, a right leg 84 joined to an upper portion of the left leg 83, a reinforcement member 86 extending with a right gusset plate 85 between the right leg 84 and the pivot tube 81, a cross member 87 extending between the left and right legs 83, 84 in the vicinity of the center in the vertical direction of the main stand 80, and a foot holder 88 mounted on a lower portion of the left leg 83.

The left leg 83 has an upper end 83a joined by the left gusset plate 82 to a first point Pl that is spaced a predetermined distance L1 to the left from a vehicle body center CL on the pivot tube 81, and extends leftward and downwardly from the upper end 83a, is curved and extends downwardly, and has a lower end 83b to which a ground plate 83c is attached.

The right leg 84 has an upper end 84a joined to a portion of the left leg 83, i.e., a point Hp that is spaced downwardly a height H from the center (pivot center PL) of the pivot tube 81, extends rightward and downwardly from the upper end 84a, is curved and extends downwardly, and has a lower end 84b to which a ground plate 84c is attached.

The reinforcement member 86 has a lower end 86a joined to a portion of the right leg 84, i.e., in the vicinity of the vehicle body center CL, extends rightward and upwardly from the lower end 86a substantially parallel to the left leg 83, and has an upper end 86b joined to the pivot tube 81 by the right gusset plate 85 at a second point P2 (spaced rightward from the vehicle body center CL by a predetermined distance L2) which is in substantially symmetrical relationship to the first point P1 with respect to the vehicle body center CL.

As described above, each of the left and right legs 83, 84 comprises a bent member with a single bend. A distance L3 from the vehicle body center CL to the lower end of the left leg 83 and a distance L4 from the vehicle body center CL to the lower end of the right leg 84 are substantially the same as each other. The left leg 83 and the right leg 84, when combined together, jointly have a substantially inverted V shape as viewed from behind. The reinforcement member 86 and the right leg 84 jointly make up a V-shaped portion 91 which allows the exhaust pipes 27 (those exhaust pipes including the common pipe 28 will hereinafter referred to as the exhaust pipes 27) to extend.

As shown in FIG. 5, the upper end 83a of the left leg 83 and the upper end 86b of the reinforcement member 86 are juxtaposed horizontally, and spaced forwardly from the center of the pivot tube 81 by a distance L5. Thus, the left and right legs 83, 84 and the reinforcement member 86 are joined to the pivot tube 81 by the left and right gusset plates 82, 85.

The cross member 87 has a spring holder 89. Referring back to FIG. 4, the spring holder 89 serves to engage a spring 101 which holds the main stand 80 alternatively in the erected position and the lifted position. Specifically, a spring hook 102 is engaged by the pivot shaft attachment bolt 95, and the spring 101 is engaged by the spring hook 102 and the spring holder 89.

Operation of the main stand 80 of the above construction will be described below with reference to FIG. 6.

The right leg 84 and the reinforcement member 86 jointly make up a V-shaped portion 91 having a V-shaped form as viewed from behind. The V-shaped portion 91 is formed by bringing the junction between the right leg 84 and the reinforcement member 86 (the joint of the lower end 86a) closely to the vehicle body center CL. As a result, a relatively large space S is created in the vicinity of and rightward of the vertical center of the main stand 80, and can be used as a passage for the exhaust pipes 27. In other words, a passage for the exhaust pipes 27 can easily be provided in the vicinity of the vehicle body center CL (at a position spaced from the vehicle body center CL by a distance L6) in the erected position of the main stand 80.

Since the exhaust pipes 27 extend in the vicinity of the vehicle body center CL, the muffler 29 indicated by the imaginary lines can easily be positioned inwardly of a line B. The line B interconnects a ground protrusion 45a on a lower portion of the distal end of the rider's steps 45 and a lower profile of the rear wheel 15, and determines a bank angle θ of the motorcycle. Since the exhaust pipes 27 and the muffler 29 do not present an obstacle when the vehicle body is greatly inclined, the bank angle θ can be set to a large value.

In as much as the joined structure of the right leg 84 and the reinforcement member 86 jointly make up the V-shaped portion 91, the size of the V-shaped portion 91, i.e., the space S can be established relatively freely and easily.

The left leg 83 extends from the first point P1 that is spaced from the vehicle body center CL on the pivot tube 81 by the distance L1, and the end of the reinforcement member 86 is joined to the pivot tube 81 at the second point P2 which is in substantially symmetrical relationship to the first point P1 with respect to the vehicle body center CL. Therefore, the weight of the vehicle body can be borne in a well-balanced manner by the first and second points P1, P2 that are symmetrical in the horizontal direction. The main stand 80 can stably bear the weight of the vehicle body.

The left leg 83 extends from the first point P1 that is spaced from the vehicle body center CL on the pivot tube 81 by the distance L1, and the upper end of the right leg 84 is joined to a portion of the left leg 83. The reinforcement member 86 extends from a portion of the right leg 84 substantially parallel to the left leg 83, and has an end joined to the pivot tube 81 at the second point P2 which is in substantially symmetrical relationship to the first point Pl with respect to the vehicle body center CL. The pivot tube 81, the left and right legs 83, 84, and the reinforcement member 86 can support each other, with the result that the rigidity of the main stand 80 is increased. Since the main stand 80 is highly rigid, the diameter and thickness of the members of the main stand 80 can be reduced for a reduction in the weight thereof.

Each of the left and right legs 83, 84 comprises a bent member with a single bend. Since the left and right legs 83, 84 are of a relatively simple shape, they can easily be bent to shape. Because the left and right legs 83, 84 comprise a bent member with a single bend, they have a higher level of rigidity than would be if they had more bends, so that the diameter and thickness of the left and right legs can be reduced for a reduction in the weight thereof.

In the above embodiment, the main stand 80 may be mounted on the vehicle body frame 2, rather than the engine 11. Moreover, the main stand 80 may be vertically swingably mounted on the vehicle body frame 2 or the engine 11. For example, the main stand 80 may be mounted directly, rather than by the left and right stand attachment brackets 70L, 70R.

One of the left and right legs 83, 84 extends from the first point P1 on the pivot tube 81, and the other of the left and right legs 83, 84 has an upper end joined to a portion of the one leg. The reinforcement member 86 extends obliquely outwardly and upwardly from a portion of the other leg and has an end joined to the pivot tube 81 at the second point P2, so that the reinforcement member 86 and the other leg jointly make a V-shaped portion which allows the exhaust pipes 27 (including the common pipe 28) to extend. For example, if the right leg 84 extends from the first point P1, then the left leg 83 and the reinforcement member 86 jointly make a V-shaped portion.

The pivot tube 81 may be rotatable on the pivot center PL, and may be of a structure divided into a left portion to which the upper end 83a of the left leg 83 is joined and a right portion to which the upper end 86b of the reinforcement member 86 is joined.

In the main stand 80, the left and right gusset plates 82, 85 and the cross member 87 may be included or dispensed with as desired.

According to the present invention, the above arrangement offers the following advantages:

Since the reinforcement member and the other of the left and right legs jointly make the V-shaped portion which allows the exhaust pipes to extend, a passage for the exhaust pipes of the engine can easily be provided in the vicinity of the vehicle body center in the erected position of the main stand. Since the exhaust pipes and the muffler do not present an obstacle when the vehicle body is greatly inclined, the bank angle can be set to a large value.

One of the left and right legs extends from the first point that is spaced from the vehicle body center on the pivot tube by a predetermined distance, and the end of the reinforcement member is joined to the pivot tube at the second point which is in substantially symmetrical relationship to the first point with respect to the vehicle body center. Therefore, the weight of the vehicle body can be borne in a well-balanced manner by the first and second points that are symmetrical in the horizontal direction. Therefore, the main stand can stably bear the weight of the vehicle body.

One of the left and right legs extends from the first point that is spaced from the vehicle body center on the pivot tube by the predetermined distance, and the upper end of the other of the left and right legs is joined to a portion of the one leg. The reinforcement member extends obliquely outwardly and upwardly from a portion of the other leg, and has an end joined to the pivot tube at the second point which is in substantially symmetrical relationship to the first point with respect to the vehicle body center. The left and right legs can support each other, with the result that the rigidity of the main stand is increased. Since the main stand is highly rigid, the diameter and thickness of the members of the main stand can be reduced for a reduction in the weight thereof.

Each of the left and right legs comprises a bent member with a single bend. Since the left and right legs are of a relatively simple shape, they can easily be bent to shape. Because the left and right legs comprise a bent member with a single bend, they have a higher level of rigidity than would be if they had more bends, so that the diameter and thickness of the left and right legs can be reduced for a reduction in the weight thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A main stand structure for a two-wheel vehicle, comprising:
    a first tube member having a bend therein;
    a second tube member having a bend therein, said first tube member being attached at a mid upper part of said second tube member;
    a cross member being positioned between said first and second tube members and below the attaching location of said second tube to said first tube, said cross member for providing stability to said main stand structure; and
    a reinforcement member being obliquely attached to said first tube member at a mid upper end thereof, said reinforcement member extending from said first tube member and equaling substantially a height of said second tube member.

2. The main stand structure for a two-wheel vehicle as set forth in claim 1, further comprising a pivot tube extending between an upper end of said second-tube member and an upper end of said reinforcement member, said pivot tube for attaching said main stand structure to a body part of a vehicle.

3. The main stand structure for a two-wheel vehicle as set forth in claim 2, wherein said upper end of said second tube and said upper end of said reinforcement member are juxtaposed horizontally and spaced forwardly from a center of said pivot tube by a predetermined distance.

4. The main stand structure for a two-wheel vehicle as set forth in claim 1, wherein said first tube member and said reinforcement member being attached provide a V-shaped portion, wherein a mouth part of said V-shaped portion directs away from said second tube and a point part of said V-shaped portion lies in a plane being offset from a center between said first and second tubes, said V-shaped portion providing a large space for a passage of an exhaust pipe of a vehicle.

5. The main stand structure for a two-wheel vehicle as set forth in claim 1, wherein said cross member includes a spring holder attached thereto, said spring holder for engaging a spring which holds the main stand in an erected or lifted position.

6. The main stand structure for a two-wheel vehicle as set forth in claim 1, wherein said first and second tube members each have a ground plate connected to a distal end thereof.

7. A main stand structure for a two-wheel vehicle, comprising:
    a first tube member;
    a second tube member, said first tube member being attached at a mid upper part of said second tube member;

a cross member being positioned between said first and second tube members and below the attaching location of said second tube to said first tube, said cross member for providing stability to said main stand structure;

a reinforcement member being obliquely attached to said first tube member at a mid upper end thereof, said reinforcement member extending from said first tube member and equaling substantially a height of said second tube member; and a pivot tube extending between an upper end of said second tube member and an upper end of said reinforcement member, wherein said pivot tube attaches to left and right stand attachment brackets being connected to a vehicle body via a pivot shaft which passes through said pivot tube and said left and right stand attachment brackets.

8. The main stand structure for a two-wheel vehicle as set forth in claim 7, further comprising an exhaust pipe hanger attached to said right stand attachment bracket.

9. The main stand structure for a two-wheel vehicle as set forth in claim 7, wherein said upper end of said second tube member and said upper end of said reinforcement member are juxtaposed horizontally and spaced forwardly from a center of said pivot tube by a predetermined distance.

10. The main stand structure for a two-wheel vehicle as set forth in claim 7, wherein said first tube member and said reinforcement member being attached provide a V-shaped portion, wherein a mouth part of said V-shaped portion directs away from said second tube and a point part of said V-shaped portion lies in a plane being offset from a center between said first and second tubes, said V-shaped portion providing a large space for a passage of an exhaust pipe of a vehicle.

11. The main stand structure for a two-wheel vehicle as set forth in claim 7, wherein said cross member includes a spring holder attached thereto, said spring holder for engaging a spring which holds the main stand in an erected or lifted position.

12. The main stand structure for a two-wheel vehicle as set forth in claim 7, wherein said first and second tube members each have a ground plate connected to a distal end thereof.

13. The main stand structure for a two-wheel vehicle as set forth in claim 9, wherein said exhaust pipe hanger is positionable between a V-shaped portion formed by said second tube member and said reinforcement member.

14. The main stand structure for a two-wheel vehicle as set forth in claim 7, wherein said first and second tube members each have one bent portion.

* * * * *